United States Patent [19]
Porter

[11] Patent Number: 6,079,734
[45] Date of Patent: Jun. 27, 2000

[54] AIR BAG COVER ASSEMBLY HAVING A SWITCH MODULE AND METHOD OF MAKING SAME

[75] Inventor: Randolph S. Porter, Grand Blanc, Mich.

[73] Assignee: Larry J. Winget, Leonard, Mich.

[21] Appl. No.: 09/198,012

[22] Filed: Nov. 23, 1998

[51] Int. Cl.[7] .................................................. B60R 21/20
[52] U.S. Cl. ..................................... 280/728.3; 200/61.54
[58] Field of Search ................................ 280/728.3, 731; 200/61.54

[56] References Cited

U.S. PATENT DOCUMENTS

| | | |
|---|---|---|
| 4,934,735 | 6/1990 | Embach . |
| 5,062,661 | 11/1991 | Winget . |
| 5,085,462 | 2/1992 | Gualtier . |
| 5,186,490 | 2/1993 | Adams et al. . |
| 5,198,629 | 3/1993 | Hayashi et al. . |
| 5,308,106 | 5/1994 | Heidorn . |
| 5,338,059 | 8/1994 | Inoue et al. . |
| 5,344,185 | 9/1994 | Cooke, II . |
| 5,369,232 | 11/1994 | Leonelli . |
| 5,371,333 | 12/1994 | Kanai et al. . |
| 5,499,841 | 3/1996 | Trojan et al. . |
| 5,577,766 | 11/1996 | Niwa et al. ............................. 280/731 |
| 5,639,114 | 6/1997 | Margetak et al. . |
| 5,642,901 | 7/1997 | Bowman et al. .................... 280/728.3 |
| 5,642,905 | 7/1997 | Honda . |
| 5,685,561 | 11/1997 | Kauer . |
| 5,721,409 | 2/1998 | Enders ................................... 280/731 |

*Primary Examiner*—Peter C. English
*Attorney, Agent, or Firm*—Brooks & Kushman P.C.

[57] ABSTRACT

An air bag cover assembly is provided. The assembly includes a front panel having inner and outer surfaces and a switch module attached to the inner surface of the front panel. The switch module includes a front plate and a back plate attached to and spaced apart from the front plate to define a switch pocket therebetween and a switch disposed in the switch pocket. The front plate has a plurality of spaced ribs integrally formed at and projecting from an outer surface of the front plate towards the inner surface of the front panel. Distal ends of the ribs are shaped to substantially conform to the inner surface of the front panel so that pressure on the outer surface of the front panel at a switch activation area is transmitted by the ribs to activate the switch.

12 Claims, 1 Drawing Sheet

AIR BAG COVER ASSEMBLY HAVING A SWITCH MODULE AND METHOD OF MAKING SAME

TECHNICAL FIELD

This invention relates to air bag cover assemblies and, in particular, to air bag cover assemblies having a switch module incorporated therein and methods of making same.

BACKGROUND ART

Presently, when air bag covers are provided in automobiles on the driver's side of the vehicle, the air bag is stored in the steering column behind an air bag cover. During automatic inflation of the air bag, the air bag cover moves away from the steering column to permit the air bag to perform its safety function between the steering column and the operator of the vehicle.

Recent practice in the automotive industry is utilization of all plastic fabricated air bag covers. Conventional air bag covers used in conjunction with occupant restraint systems often include various switches such as horn switches.

U.S. Pat. No. 5,371,333 discloses a steering wheel pad with a horn switch assembly. A plurality of ribs are integrally formed on a bottom surface of an outer member. The ribs abut with the top surface of an inner member on the top surface of a switch body of a horn switch. When the outer member is not pressed, the ribs maintain the outer member in a predetermined shape. When the outer member is pressed, the ribs transmit the pressure to the switch body.

U.S. Pat. No. 5,085,462 issued to Gaultier discloses an air bag and vehicle horn switch assembly. Gaultier also discloses a conventional two-piece cover construction.

U.S. Pat. No. 5,186,490 issued to Adams et al. discloses a cover or an inflatable restraint system for a motor vehicle which contains a slot in the upper wall thereof into which a replaceable thin or membrane-type switch assembly is inserted.

The Embach U.S. Pat. No. 4,934,735 discloses a device which has inner and outer covers or plates, each of which has split lines which separate the upper walls into upwardly and oppositely opening upper and lower pairs of flaps to permit deployment of the inflatable cushion. A switch assembly is located between either or both pair of flaps and includes one or more membrane switches located between the flaps and respective key pads projecting outwardly of the cover flap for closing respective pairs of circuits on the upper and lower flexible membranes of the membrane switch to each other.

The Heidorn U.S. Pat. No. 5,308,106 discloses an air bag module cover assembly with a switch subassembly removably attached at a front surface of the assembly.

The Winget U.S. Pat. No. 5,062,661 discloses a rigid plate attached to the substantially rigid remainder of a front panel of an air bag cover to define a hollow compartment which together move upon manual actuation of a flexible, manually operable diaphragm at the front surface of the front panel. The front panel has a first electrically conductive inner surface for making a circuit path with a corresponding second electrically conductive inner surface of the rigid plate.

The Cooke, II U.S. Pat. No. 5,344,185 discloses an air bag cover having a replaceable horn switch and a removable cover band.

The Leonelli U.S. Pat. No. 5,369,232 discloses a membrane horn blow switch integrated into the front panel of an air bag cover. More specifically, the membrane switch seats in and fills a horn actuation area which is a step-down portion of the cover reduced in thickness.

The U.S. patent to Hayashi et al. 5,198,629 discloses a steering wheel having an insert molded membrane switch.

The U.S. patent to Inoue et al. 5,338,059 discloses an air bag cover including a horn switch.

The U.S. patent to Trojan et al. 5,499,841 discloses a housing assembly for an air bag and a vehicle horn switch.

The U.S. patent to Margetak et al. 5,639,114 discloses an air bag cover having a plurality of force concentrators which cooperate with projections of a horn switch to concentrate force applied to the cover.

The U.S. patent to Bowman et al. 5,642,901 discloses a relatively flexible thermoplastic air bag cover including a front panel wherein switch activating members enhance activation of a membrane-type switch located at a switch location area of the front panel. This feature provides pressure points which enhance activation of the membrane-type switch. The switch activating members are located on the rear inner surface of the cover in one embodiment and, in another embodiment, on the upper surface of a back plate which provides a hollow compartment for the switch. The switch activating members can be integrally formed in the shape of small circles, ribs, raised dots, X's, etc.

The U.S. patent to Kauer 5,685,561 discloses a relatively flexible thermoplastic air bag cover assembly having a switch and method of manufacturing same including a thermoplastic electromagnetic material which forms welds between front and back panels of the assembly. The welded front and back panels define a switch pocket therebetween to hold the switch such as a membrane-type horn switch therein. The welds occupy a relatively small amount of surface area yet provide strong polymer-to-polymer linkages between the front and back panels, thereby enlarging the effective switch activation area on the outer surface of the front panel. The welds are located very close to the switch pocket without damaging the switch during manufacturing. The bonds provided by the welds between the front and back panels are strong enough to prevent the switch from exiting the switch pocket during air bag deployment.

One problem associated with some of the prior art is that the inner surface of the front panel of the cover has projections formed thereon to facilitate switch activation. These projections, however, present problems in that: the mold is relatively complicated in construction, the cover tends to stick to the mold surface, the outer surface of the front panel is a Class "A" surface which is effected by such difficulties, and each cover often requires specialized tooling.

SUMMARY OF THE INVENTION

An object of the present invention is to provide an air bag cover assembly and method of making same which overcomes many of the problems associated with the prior art.

Another object of the present invention is to provide an air bag cover assembly and method of making same which provide the following advantages over the prior art: a readily available cosmetic Class "A" outer surface of the front panel; reduced tool complexity; ease of tool operation; air bag cover simplicity; and a generic cover for use in multiple applications.

In carrying out the above objects and other objects of the present invention, an air bag cover assembly is provided. The assembly includes a front panel having inner and outer surfaces and a switch module attached to the inner surface of the front panel. The switch module includes a front plate and a back plate attached to and spaced apart from the front plate to define a switch pocket therebetween and a switch disposed in the switch pocket. The front plate has a plurality of spaced ribs integrally formed at and projecting from an outer surface of the front plate towards the inner surface of the front panel. Distal ends of the ribs are shaped to substantially conform to the inner surface of the front panel so that pressure on the outer surface of the front panel at a switch activation area is transmitted by the ribs to activate the switch.

Preferably, the inner surface of the front panel has a generally smooth contour at the switch activation area and the front panel includes a tear seam formed therein about the switch activation area.

Also, preferably, the front panel includes at least one rim portion integrally formed at and projecting away from the inner surface about the switch activation area of the front panel towards the outer surface of the front plate. The switch module is attached to the inner surface of the front panel at the at least one rim portion.

Preferably the at least one rim portion is a thermoplastic rim portion and the assembly further includes a weld disposed in a space between the at least one thermoplastic rim portion and the switch module. The weld is defined by a thermoplastic electromagnetic material which, when melted and placed under pressure is caused to conform to the configuration of the space to bond to and secure together surface layers of the at least one rim portion and the switch module at the space by polymer-to-polymer linkages.

Also, preferably, the switch is a membrane-type switch such as a horn switch.

Preferably, the front plate is a thermoplastic front plate and the thermoplastic of the at least one rim portion is compatible to be electromagnetically welded with the thermoplastic of the front plate.

Also, preferably, the back plate is a thermoplastic back plate and the thermoplastic of the front plate is compatible to be electromagnetically welded with the thermoplastic of the back plate.

Further in carrying out the above objects and other objects of the present invention, a method of manufacturing the thermoplastic air bag cover assembly is provided. The assembly includes a front panel having at least one thermoplastic rim portion integrally formed at and projecting away from an inner surface of the front panel about a switch activation area, a switch module including a front plate and a back plate spaced apart from the front plate to define a switch pocket therebetween, the front plate having a plurality of spaced ribs integrally formed at and projecting from an outer surface of the front plate, and a switch disposed in the switch pocket. The method includes the step of positioning the switch module and the front panel so that the at least one thermoplastic rim portion of the front panel and an outer surface of the switch module define a space therebetween, and distal ends of the ribs substantially conform to the inner surface of the front panel. The method also includes the steps of positioning a thermoplastic electromagnetic material in the space and establishing an electromagnetic field about the positioned thermoplastic electromagnetic material for a time sufficient to melt the material to obtain molten material within the space. The molten material melts surface layers of the at least one rim portion and the switch module defining the space. Also, the method includes the steps of forcing the surface layers together to cause the molten material to flow and be contained within the space and allowing the molten material and the surface layers to cool wherein the molten material is fused with the surface layers causing polymer-to-polymer linkages therebetween.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
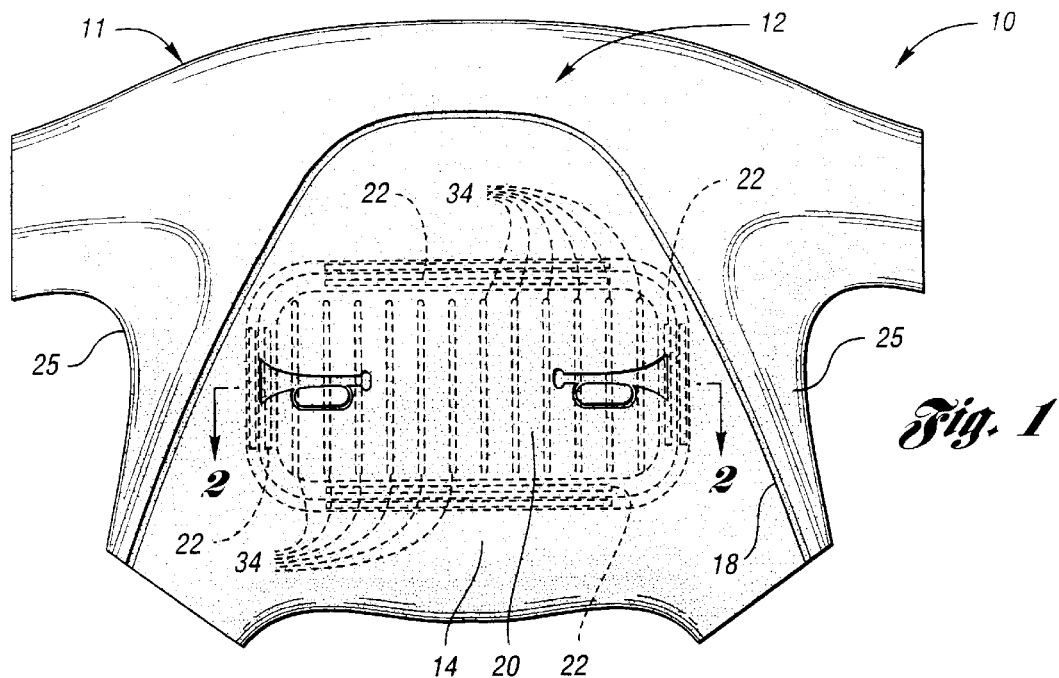
FIG. 1 is a front elevational view of an air bag cover assembly constructed in accordance with the present invention.
Figure 2:
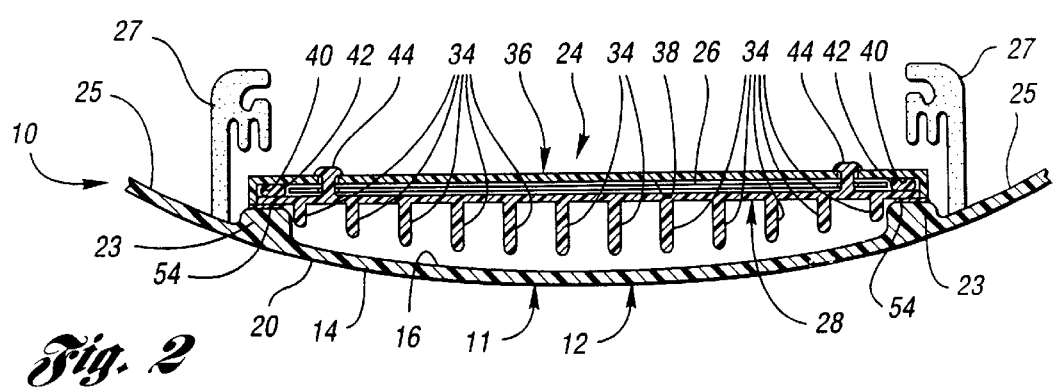
FIG. 2 is a view, partially broken away and in cross-section, of the assembly of FIG. 1 taken along lines 2—2.
Figure 3:
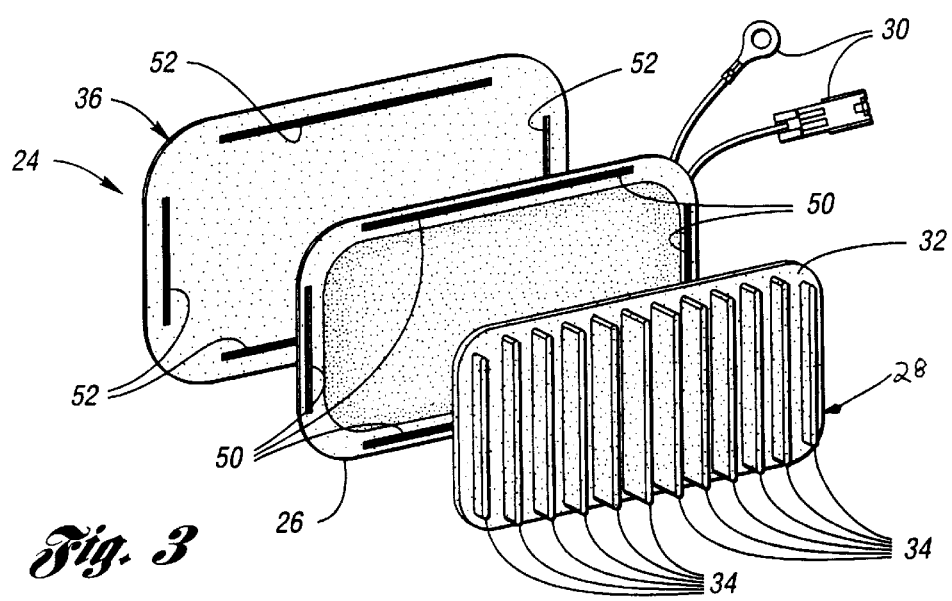
FIG. 3 is an exploded perspective view of a horn switch module of the present invention.

Referring now to the drawing Figures, there is illustrated in FIGS. 1–3 an automotive air bag cover assembly, generally indicated at 10, constructed in accordance with the present invention. Typically, the air bag cover assembly 10 is adapted to be secured at the top end of the vehicle drive column (not shown) at the steering wheel of the vehicle.

The air bag cover assembly 10 preferably includes a relatively flexible thermoplastic air bag cover, generally indicated at 11, formed by injection molding with a thermoplastic such as Santoprene® (a trademark of Monsanto Company) or Hytrel® (a trademark of Dupont).

The air bag cover 11 includes a front panel, generally indicated at 12, overlying an undeployed air bag (not shown). The front panel 12 has a front outer surface 14 and a rear inner surface 16.

The front panel 12 is separable along a prescribed tear pattern 18 upon deployment of the air bag. Alternatively, the tear pattern may be hidden when viewing the assembly 10 from the front surface 14.

The front panel 12 includes a horn switch activation area 20 and a weld or border area 22 which extends about the activation area 20 at a plurality of rim portions 23 (FIG. 2). The rim portions 23 are integrally formed at and project away from the inner surface 16 of the front panel 12 about the switch activation area 20. The inner surface 16 has a generally smooth contour at the switch activation area 20. The border area 22 is shown in FIG. 1 as bordering the activation area 20 on four sides but may border the activation area 20 on less than four sides thereof.

Curved side walls 25 of the air bag cover 11 extend rearwardly from the front panel 12 as shown in FIGS. 1 and 2. On the inner surface of the side walls 25 there is preferably integrally formed snap-on attachment mechanisms 27 generally of the type illustrated in U.S. Pat. No. 5,501,485 for securing the assembly 10 to an air bag container.

The air bag cover assembly 10 also includes a horn switch module, generally indicated at 24, which is attached to the inner surface 16 of the front panel 12. The module 24 includes a switch such as a membrane-type or foil switch, schematically illustrated at 26 in FIGS. 2 and 3 which lies behind the rear inner surface of a front thermoplastic plate, generally indicated at 28, in the switch activation area 20. The switch 26 includes electrical leads 30 adapted to be connected to the vehicle's electrical system as shown in FIG. 3.

A front outer surface 32 of the front plate 28 has a plurality of spaced ribs 34 integrally formed thereon and which ribs 34 project toward the inner surface 16 of the front panel 12. Distal ends of the ribs 34 are shaped to substantially conform to the inner surface 16 of the front panel 12 so that pressure on the outer surface 14 of the front panel 12 at the switch activation area 20 is transmitted initially by the front panel 12 through the substantially uniform distance between the front panel 12 and the distal ends of the ribs 34 and then by the ribs 34 to activate the switch 26. By placing the ribs 34 on the outer surface 32 of the front plate 28, many of the objects of the present invention are realized as noted above.

The module 24 of the air bag cover assembly 10 also includes a plastic back panel or plate, generally indicated at 36 in FIGS. 2 and 3. The back plate 28 is mounted to the front panel by being bonded to the rear inner surface of the front plate 28 in containing relation to the switch 26 to form a hollow switch area or pocket 38 for the switch 26. The plastic of the back plate 36 is compatible with the thermoplastic of the front plate 28 and may comprise a stiffer polyester such as Bexloy.

Closed channels 40 are formed between the front and back plates 28 and 36, respectively, in which welds 42 in the form of thermoplastic electromagnetic material are located to bond the front and back plates 28 and 36 together. Heat stakes 44 may be provided either together with or as an alternative to the welds 42 to bond the front and back plates 28 and 36 together.

Attaching the Module 24 to the Front Panel 12

Before or during attachment of the module 24 to the front panel 12, the module 24 is formed. Initially, the front and back plates 28 and 36, respectively, are positioned so that their inner surfaces are adjacent but spaced from one another. In this position, the channels 40 and the switch pocket 38 are formed.

Strips of a thermoplastic electromagnetic material, such as an EMAWELD® material, are positioned in the channels 40 and a switch such as the foil switch 26 is positioned in the switch pocket 38. Preferably, the foil switch 26 has apertures 50 so that heat stakes 44 extending from the inner surface of the front plate 28 extend therethrough and through aligned apertures 52 formed in the back plate 36. Then, the resulting module 24 is positioned so that the rim portions 23 and the outer surface 32 of the front plate 28 define a space therebetween in which additional strips 54 of EMAWELD® material are positioned.

An electromagnetic field is then established about the EMAWELD® material positioned in the channels 40 and in the space for a time sufficient to melt the material. The molten material, in turn, melts surface layers of the front and back plates 28 and 36 which contact the molten material as well as surface layers of the rim portions 23 and the front plate 28. This step can be accomplished by controllably energizing electromagnetic transmission coils (not shown) coupled to an induction generator (not shown), such as an induction generator generally available from Emabond® Systems, a division of Ashland Chemical Company, of Norwood, N.J.

The adjacent surfaces are forced together such as by urging corresponding pairs of the work coils together to cause the molten material to flow within the channels 40 and the space between the front panel 12 and the module 24 and further cause surface layers of the front and back plates 28 and 36 and the rim portions 23 to melt.

The molten material and the molten surface layers are allowed to cool and solidify. In this way, the material fuses with the front and back plates 28 and 36 and the rim portions 23, causing polymer-to-polymer linkages. This provides extremely strong bonds considering the relatively small surface area by which the module 24 is secured to the front panel 12.

In this way, the welds formed by the thermoplastic electromagnetic material provide very strong yet narrow bonds between the front and back plates 28 and 36, respectively. These welds can be located very close to the foil switch 26 in its switch pocket 38 without damaging the foil switch 26 during manufacturing. The bonds between the front and back plates 28 and 36, even though occupying a relatively small amount of surface area, are strong enough to prevent the foil switch 26 from exiting its switch pocket 38 during air bag deployment. In other words, the back plate 36 remains bonded to the front plate 28 which, in turn, remains bonded to the front panel 12 to maintain the switch pocket 38 during tearing of the front panel 12 along its tear seam 18.

While the best mode for carrying out the invention has been described in detail, those familiar with the art to which this invention relates will recognize various alternative designs and embodiments for practicing the invention as defined by the following claims.

What is claimed is:

1. An air bag cover assembly comprising:
   a front panel having inner and outer surfaces; and
   a switch module attached to the inner surface of the front panel, the switch module including a front plate and a back plate attached to and spaced apart from the front plate to define a switch pocket therebetween and a switch disposed in the switch pocket wherein the front plate has a plurality of spaced ribs integrally formed at and projecting from an outer surface of the front plate towards the inner surface of the front panel and wherein distal ends of the ribs are shaped to substantially conform to the inner surface of the front panel so that pressure on the outer surface of the front panel at a switch activation area is transmitted by the ribs to activate the switch.

2. The assembly as claimed in claim 1 wherein the inner surface of the front panel has a generally smooth contour at the switch activation area.

3. The assembly as claimed in claim 1 wherein the front panel includes a tear seam formed therein about the switch activation area.

4. The assembly as claimed in claim 1 wherein the front panel includes at least one rim portion integrally formed at and projecting away from the inner surface about the switch activation area of the front panel towards the outer surface of the front plate and wherein the switch module is attached to the inner surface of the front panel at the at least one rim portion.

5. The assembly as claimed in claim 4 wherein the at least one rim portion is a thermoplastic rim portion and wherein the assembly further comprises a weld disposed in a space between the at least one thermoplastic rim portion and the switch module and being defined by a thermoplastic electromagnetic material which, when melted and placed under pressure is caused to conform to the configuration of the space to bond to and secure together surface layers of the at least one rim portion and the switch module at the space by polymer-to-polymer linkages.

6. The assembly as claimed in claim 5 wherein the front plate is a thermoplastic front plate.

7. The assembly as claimed in claim 6 wherein the thermoplastic of the at least one rim portion is compatible to be electromagnetically welded with the thermoplastic of the front plate.

8. The assembly as claimed in claim 6 wherein the back plate is a thermoplastic back plate.

9. The assembly as claimed in claim 8 wherein the thermoplastic of the front plate is compatible to be electromagnetically welded with the thermoplastic of the back plate.

10. The assembly as claimed in claim 1 wherein the switch is a membrane switch.

11. The assembly as claimed in claim 10 wherein the membrane switch is a horn switch.

12. A method of manufacturing a thermoplastic air bag cover assembly including a front panel having at least one thermoplastic rim portion integrally formed at and projecting away from an inner surface of the front panel about a switch activation area, a switch module including a front plate and a back plate spaced apart from the front plate to define a switch pocket therebetween, the front plate having a plurality of spaced ribs integrally formed at and projecting from an outer surface of the front plate, and a switch disposed in the switch pocket, the method comprising the steps of:

positioning the switch module and the front panel so that the at least one thermoplastic rim portion of the front panel and an outer surface of the switch module define a space therebetween, and distal ends of the ribs substantially conform to the inner surface of the front panel;

positioning a thermoplastic electromagnetic material in the space;

establishing an electromagnetic field about the positioned thermoplastic electromagnetic material for a time sufficient to melt the material to obtain molten material within the space, the molten material melting surface layers of the at least one rim portion and the switch module defining the space;

forcing the surface layers together to cause the molten material to flow and be contained within the space; and allowing the molten material and the surface layers to cool wherein the molten material is fused with the surface layers causing polymer-to-polymer linkages therebetween.

\* \* \* \* \*